United States Patent Office 3,034,821
Patented May 15, 1962

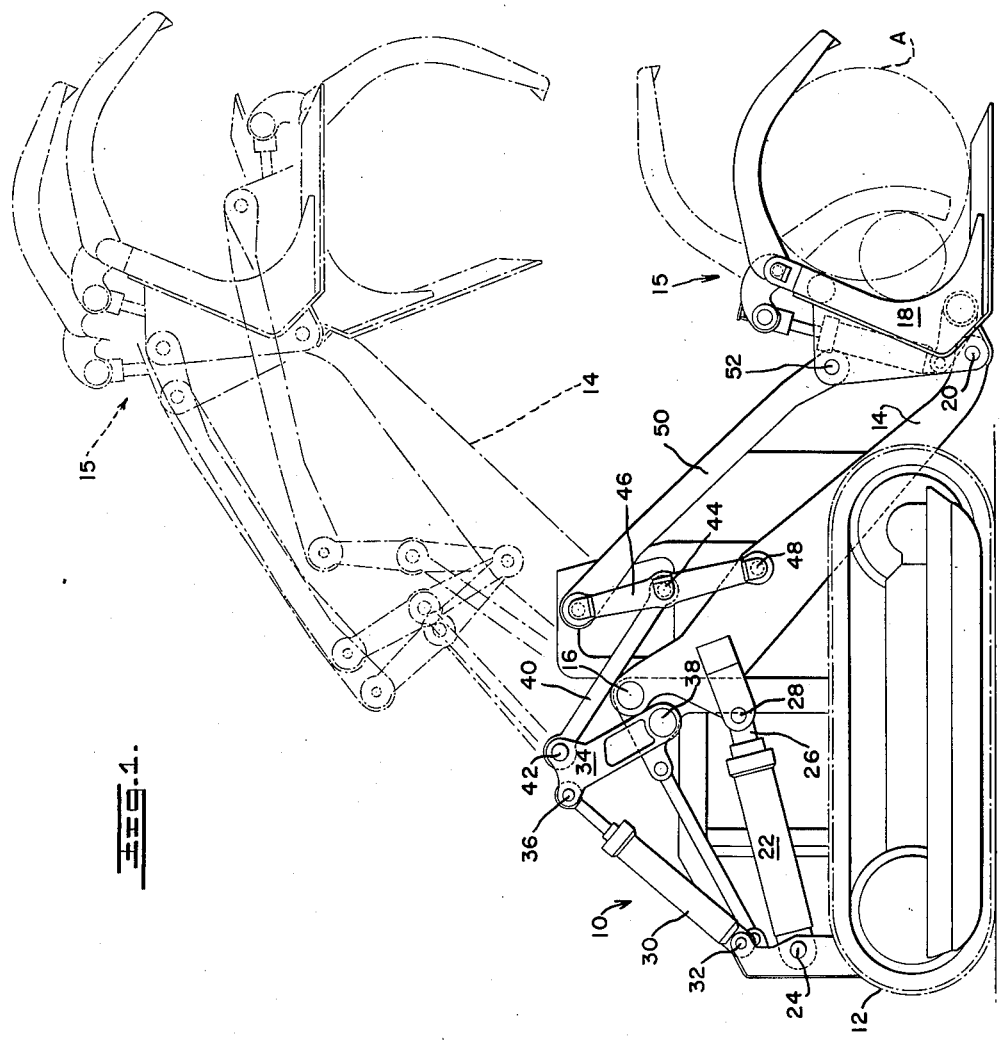

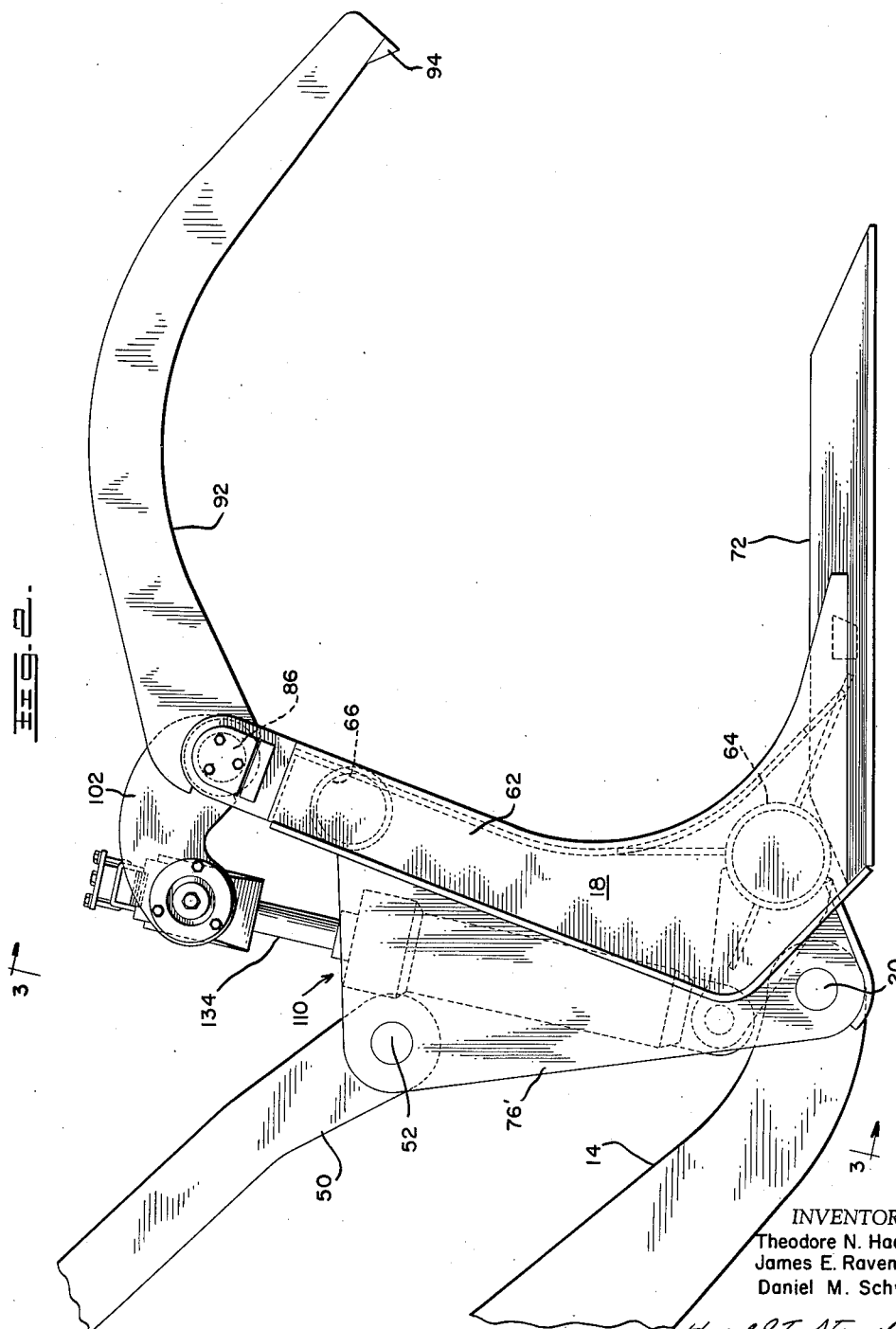

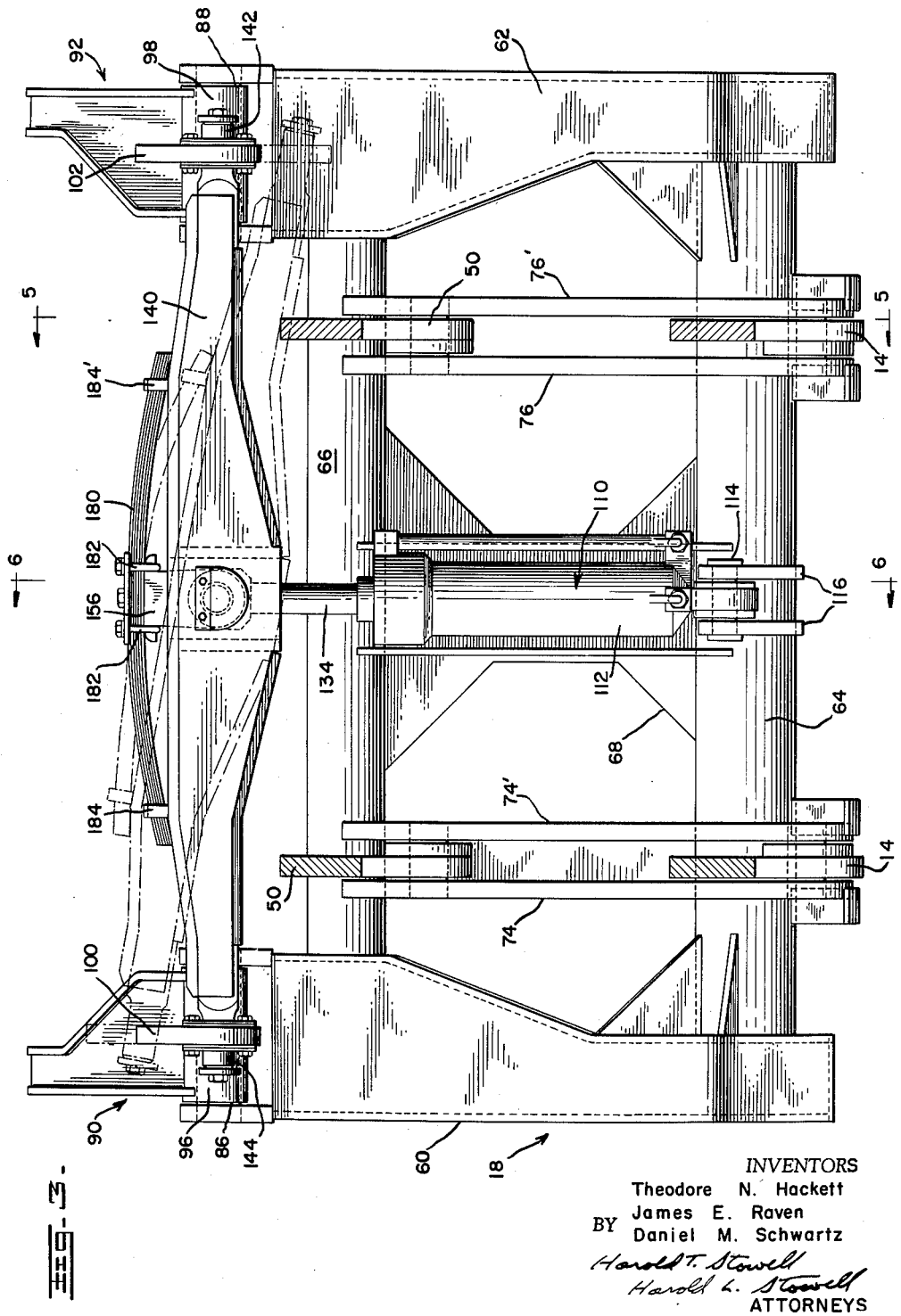

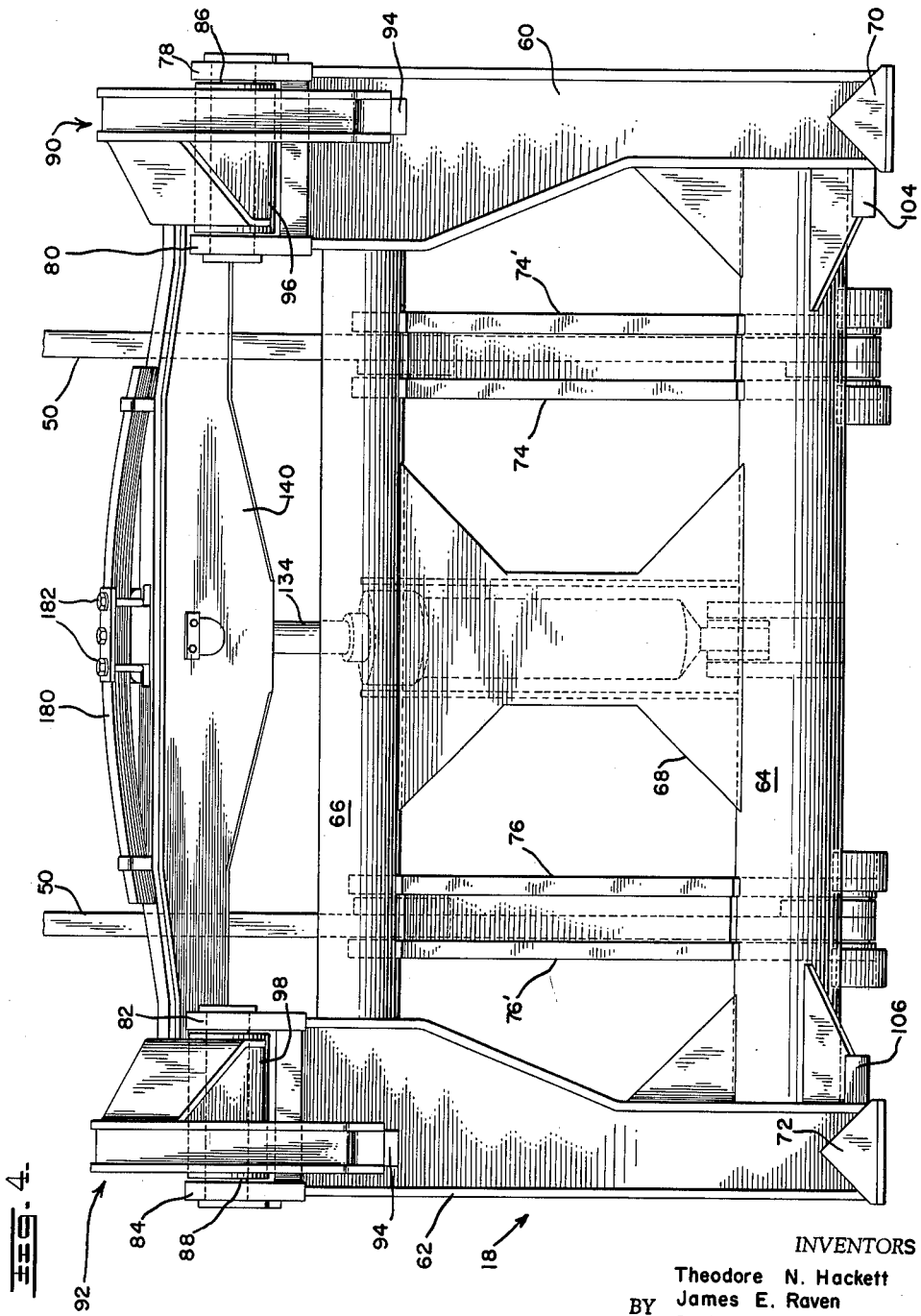

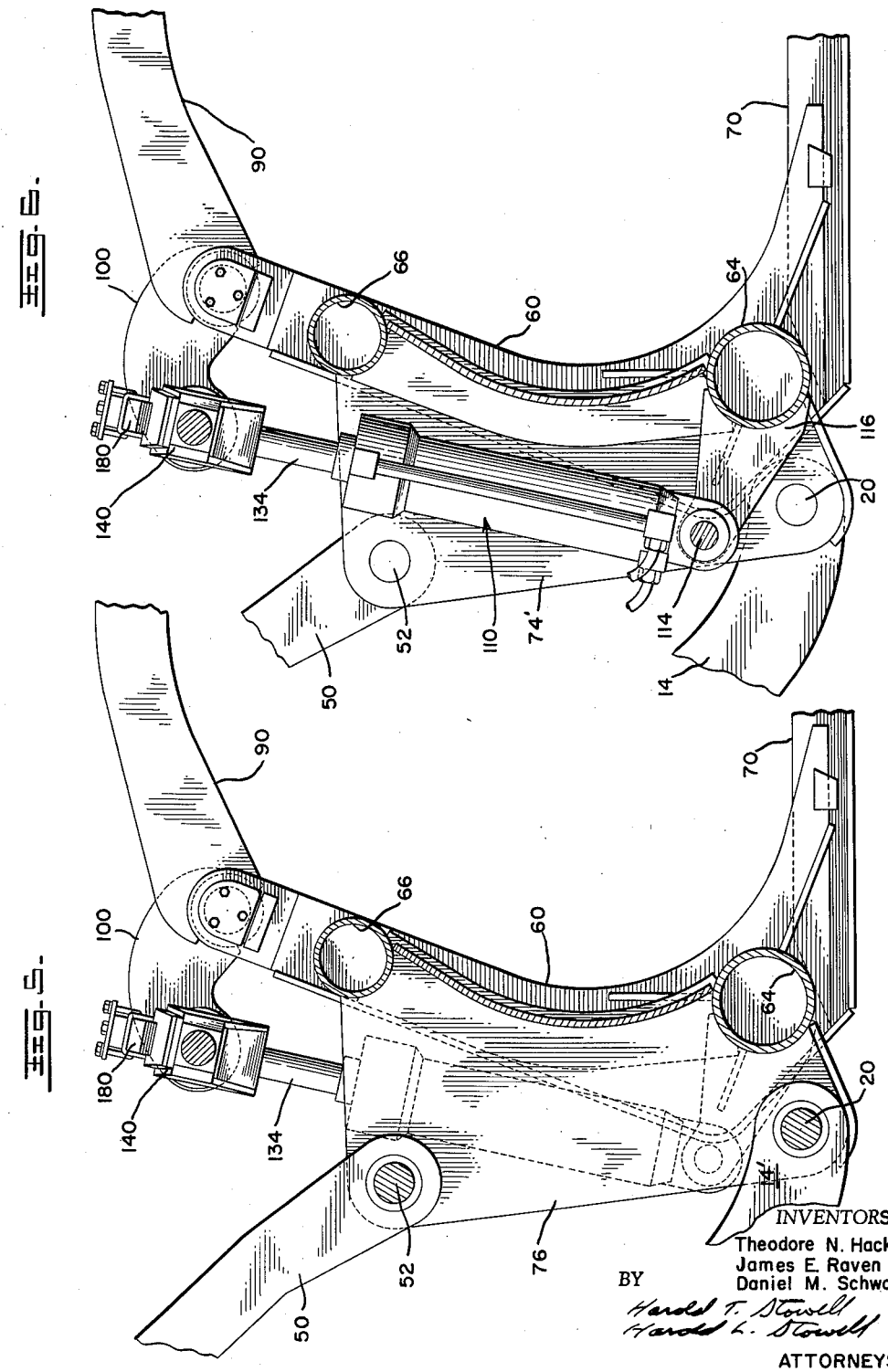

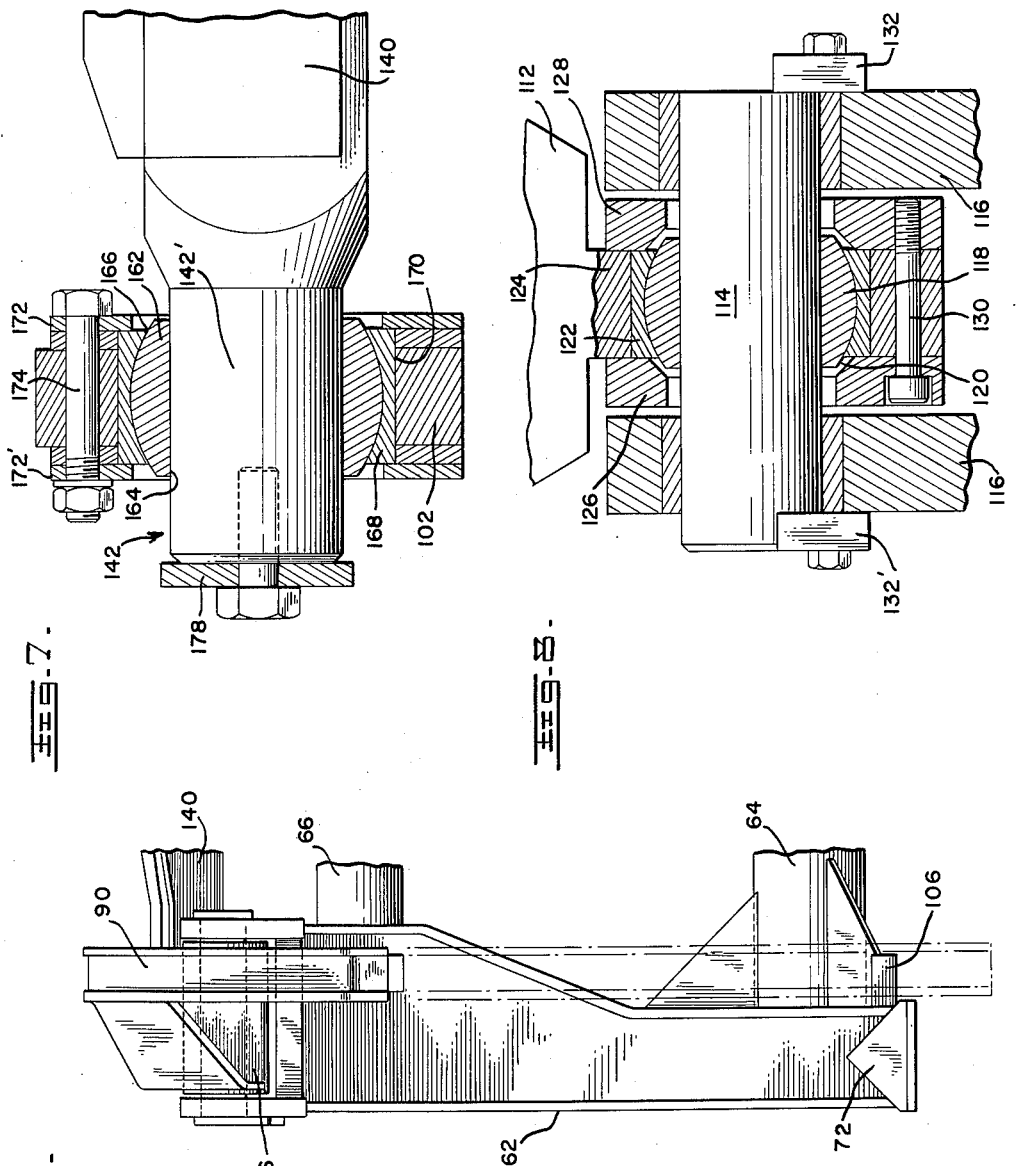

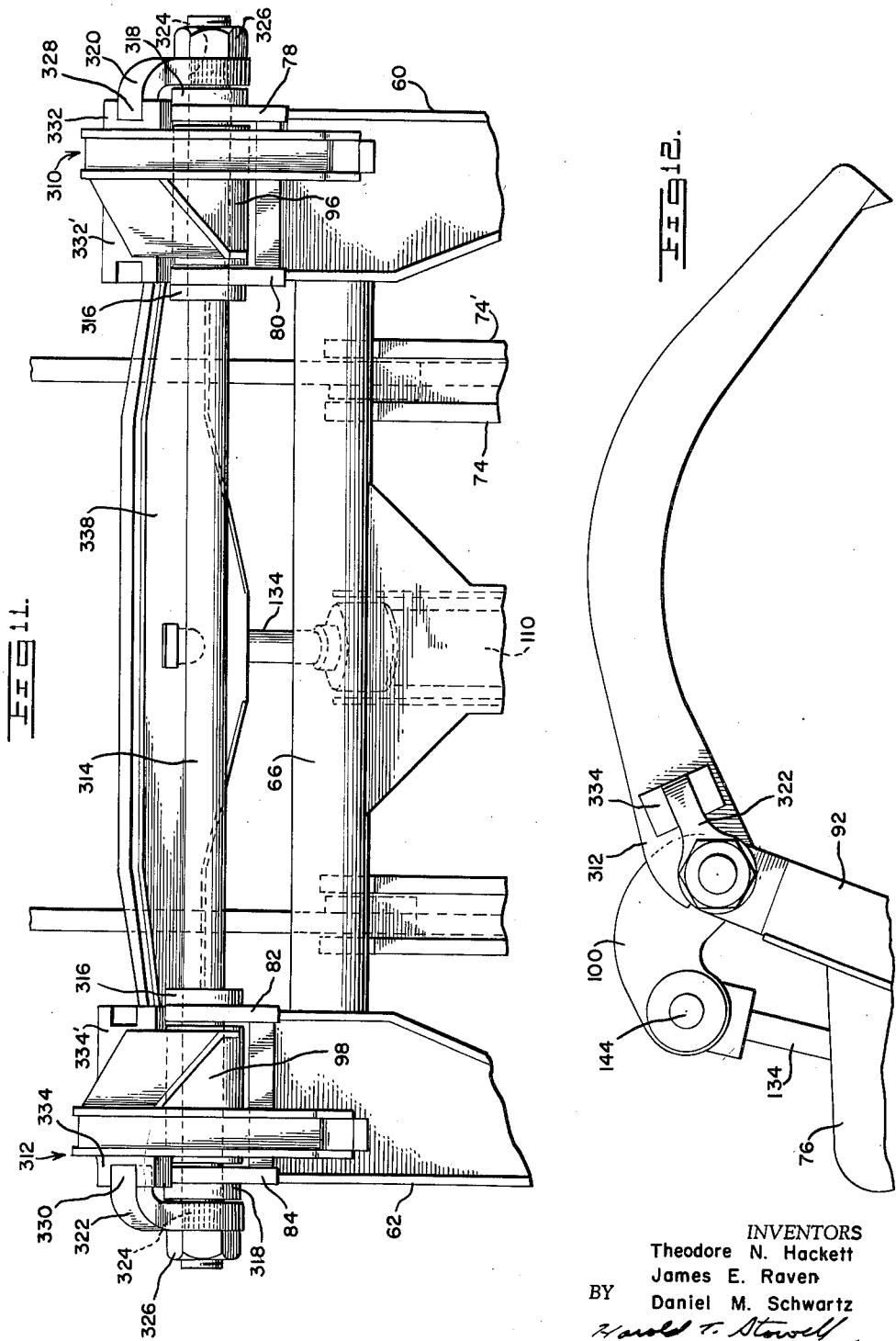

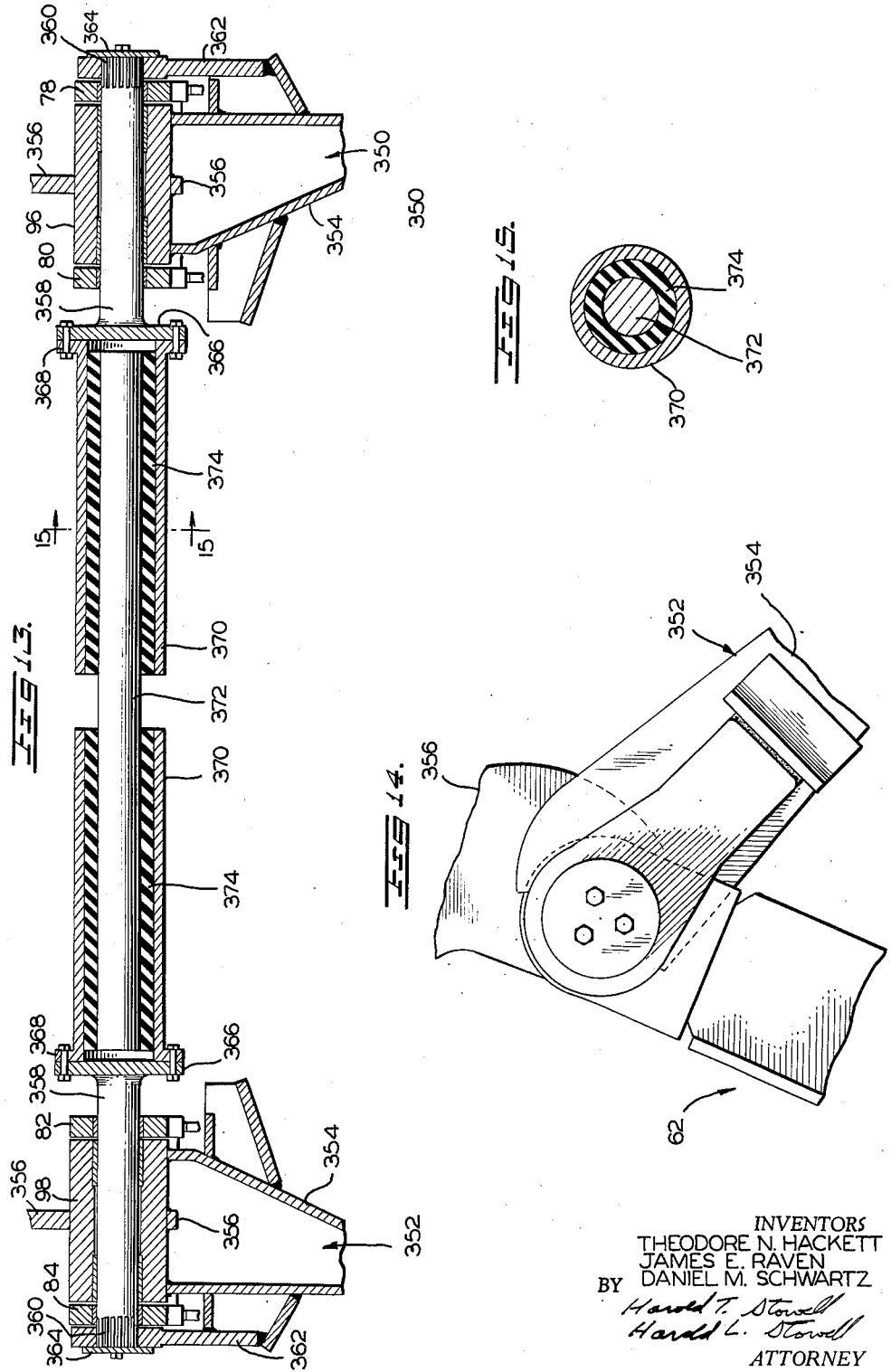

3,034,821
MATERIAL HANDLING DEVICE
Theodore N. Hackett, Salt Lake City, Utah, James E. Raven, Lafayette, Calif., and Daniel M. Schwartz, Salt Lake City, Utah, assignors to The Eimco Corporation, Salt Lake City, Utah, a corporation of Delaware
Filed Oct. 14, 1958, Ser. No. 767,175
12 Claims. (Cl. 294—88)

This invention relates to a material handling device and, more particularly, to an improved heavy duty material handling device having a wide variety of uses in excavating and clearing land and in the carrying and hndling of logs, large stones, bales and other bulky objects and materials.

The invention will be more particularly described with reference to the use of the material handling device of the invention as a logging fork including complementary clamping arms or jaws between which logs or other bulky or irregular objects may be clamped.

It is a particular object of the present invention to provide a material handling device including an equalizing bar arrangement for interconnecting a pair of clamping fork members.

It is a further object of the invention to provide improved actuating means for the movable arms of a logging fork wherein a single traction means is effectively employed to actuate movable clamping arms.

A further object is to provide an improved equalization system for the positioning and load forces between a pair of articulate material handling arms.

A further object is to provide an improved material handling assembly including fixed arms and movable arms wherein the movable arms may be selectively positioned either in or out of vertical alignment with the fixed arms.

Another object is to provide improved resilient means for allowing movable arms to adapt for clamping uneven loads and to insure a substantially balanced degree of opening for the arms when not clamping a load.

These and other objects and advantages are provided in a material handling attachment which generally comprises a frame, a fixed arm or arms extending from one end of the farme, a pair of movable arms, means pivotally mounting said pair of movable arms adjacent the other end of the frame for movement of the extended ends thereof toward and away from the fixed arm or arms, an equalizer bar extending between the pair of movable arms, means mounting each end of the equalizer bar in one arm of the pair of movable arms, the equalizer bar mounting means being offset from the pivotal mounting between the pair of movable arms and the frame, and traction means connected to the equalizer bar intermediate its ends for moving the equalizer bar to rock the movable arms into movement about their pivotal connections to said frame.

The principles of the invention will be more readily apparent to those skilled in the art from the following detailed description and the accompanying drawings wherein:

FIG. 1 is a side elevational view of a crawler mounted tractor embodying the principles of the invention;

FIG. 2 is an enlarged side elevational view of the material handling attachment of the invention;

FIG. 3 is a rear elevation of the structure shown in FIG. 2;

FIG. 4 is a front elevation of the material handling attachment shown in FIG. 2;

FIG. 5 is a section on line 5—5 of FIG. 3;

FIG. 6 is a section on line 6—6 of FIG. 3;

FIG. 7 is an enlarged detailed view of the bearing structure between one of the movable arms and the equalizer bar;

FIG. 8 is an enlarged detailed fragmentary sectional view of the lower mounting bearing for the hydraulic ram carried by the frame of the loading attachment;

FIG. 9 is a fragmentary view of a pair of the arm members with the movable arm positioned in an offset relationship to the fixed arm;

FIG. 11 is an enlarged fragmentary front elevational view of a modified form of the present invention;

FIG. 12 is a side elevational view of the structure shown in FIG. 11;

FIG. 13 is an enlarged fragmentary sectional view of a further form of resilient or torsion means adapted to interconnect the pair of movable arms;

FIG. 14 is a fragmentary end elevational view of the structure shown in FIG. 13;

FIG. 15 is a section substantially on line 15—15 of FIG. 13; and

Figure 10:
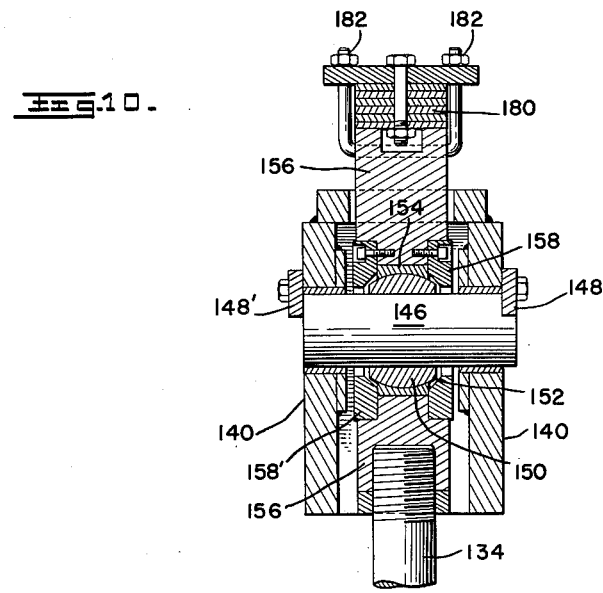
FIG. 10 is an enlarged detailed sectional view of the bearing connection between the hydraulic ram and the equalizer bar.

Referring to FIG. 1 of the drawings, 10 generally designates a mobile material handling machine mounted on conventional crawler treads 12. The material handling machine includes a front end material handling structure having a boom 14 which is pivotally mounted at 16 to the superstructure of the vehicle. At the extended end of the boom 14 is a log or other bulk material handling device generally designated 15. The frame 18 of the logging attachment 15 is pivotally mounted to the boom by pivot pin 20. The boom is pivoted from its low forward position shown in solid lines to an upwardly extending position, shown in broken lines, by a hydraulic ram 22.

The hydraulic ram 22 is pivotally mounted to the main frame of the vehicle as at 24 while the extended end of the piston rod 26 of the ram is pivotally connected as at 28 to the boom 14 below the boom's pivotal connection to the frame of the vehicle.

The front end material handling structure also includes means for pivoting the frame 18 relative to the boom 14. The means for pivoting the frame 18 includes a hydraulic ram 30 which is pivotally connected to the frame of the vehicle as at 32 and to a bell-crank 34 by pivot pin 36. The bell-crank 34 is also pivoted as at 38 to the superstructure of the vehicle, and to an arm 40 as at 42.

The other end of arm 40 is center connected as at 44 to a cross-arm 46. One end of the cross-arm is pivoted as at 48 to the boom 14 while the other end is pivotally mounted to a link or rod 50, the lower end of which is connected by pivot pin 52 to the upper portion of the frame 18 at a point spaced from the pivotal connection between the frame 18 and the boom 14.

An identical system of boom, lever arms, bell-crank, links and hydraulic rams is provided for the other side of the material handling machine whereby upon directing pressure fluid into the hydraulic rams 22 the booms 14 are pivoted about the axis of the pivot shaft 16 and raised to the extended position as shown in broken lines in FIG. 1 of the drawings. By directing pressure fluid to the hydraulic rams 30, the frame 18 of the material handling device is pivoted about the axis of pivot shafts 20 for dumping, positioning or picking up structures maintained between the forks or arms thereof as shown in phantom lines when the booms are, for example, in the raised position.

Conventional controls for directing pressure fluid to and from the hydraulic rams 22 and 30 may be employed on the material handling machine as to be described with reference to FIG. 16, or the new and improved hydraulic system shown and described in U.S. patent application, T. N. Hackett et al., Serial No. 700,821, filed December 5, 1957, now Patent No. 2,982,101, may be employed.

The improved material handling device 15 will be more particularly described with reference to FIGS. 2 through 9. The frame 18 of the attachment generally includes a pair of spaced parallel structural members 60 and 62 interconnected adjacent their lower ends by a tubular member 64 and adjacent their upper ends by a tubular member 66 which tubular members are, in turn, interconnected by plate 68, more clearly shown in FIGS. 3 and 4 of the drawings. Rigidly secured to the lower ends of each of the side members 60 and 62 of the frame 18 is a forwardly extending fork or arm 70 and 72, respectively. The arms 70 and 72 are rigid with the generally vertically extending members 60 and 62 of frame 18 and are pivoted relative to the booms 14 by actuation of the rods 50 through bell-cranks 34 and hydraulic rams 30 as hereinbefore described.

The frame 18 of the material handling attachment also includes two pairs of spaced plates 74, 74' and 76 and 76' which extend between the upper and lower tubular members 64 and 66. The upper and lower ends of each of the pair of plates 74, 74' and 76, 76' are bored to receive the pivot pins 20 and 52, forming the pivotal connections between the frame 18, the booms 14 and the tilting rods 50.

The upper ends of each of the side members 60 and 62 of the frame 18 are bifurcated and each of the bifurcations 78—80 and 82—84 are bored to receive pivot pins 86 and 88, respectively.

An arm or fork member 90 is mounted intermediate its ends for pivotal movement on pin 86 to extend both forwardly and rearwardly of the pivot pin. A second arm 92 is mounted for pivotal movement on pin 88 carried between the furcations 82 and 84 of side member 62 of frame 18. Each of the arms 90 and 92 may be provided with a depending tooth member 94 or the like at its most forward end to aid in gripping logs, bales or other material to be grasped between the fixed and movable jaws 72 and 92, 70 and 90.

As more clearly shown in FIGS. 3 and 4 of the drawings, the forwardly extending portions of each of the movable arms 90 and 92 are laterally offset from the medial plane of the sleeve bearings 96 and 98 which contact the pivot pins 86 and 88, respectively.

Each of the rearwardly extending portions 100 and 102 of the arms 90 and 92 is centered on the medial plane of its respective sleeve bearing 96 and 98. With this form of construction, the movable arms 90 and 92 may be positioned on the frame 18 with the arms 90 and 92 in vertical alignment with their complementary fixed arms 70 and 72 or the arms 90 and 92 may be reversed in position so that arm 90 cooperates with fixed arm 72 and movable arm 92 cooperates with fixed arm 70 as shown in FIG. 9 of the drawings. With the movable arms in the latter position, the movable arms are inset with respect to the fixed arms whereby the movable arms may close into abutting relationship with stop members 104 and 106 supported between the lower tubular member 64 and the inner surfaces of each of the side members 60 and 62 of the frame 18. Since the rearwardly extending portions 100 and 102, respectively, of the movable arms 90 and 92 are centrally positioned on their respective sleeve bearings 96 and 98, interchanging the position of the two arms 90 and 92 on the frame does not affect the lateral spacing between the rear portions of the arms.

The movable arms 90 and 92 are caused to rotate about the pivot pins 86 and 88 by a traction device illustrated in the drawings as a hydraulic ram and generally designated 110. The lower end of the cylinder 112 of the hydraulic ram is mounted on pivot pin 114 carried by a pair of bosses 116 secured centrally of the lower tubular member 64 of the frame 18. FIG. 8 of the drawings illustrates details of the self-aligning bearing structure connecting the cylinder 112 to the pivot pin 114, which generally includes a bearing element 118 having a spherical outer surface 120. The spherical bearing surface 120 is engaged by a complementary bearing element 122 carried by extension 124 of the cylinder 112. A pair of bearing retaining blocks 126 and 128 maintain the bearing in an assembled position through means of bolts 130. The blocks 126 and 128 also effectively limit the rocking movement permitted by the self-aligning bearing axially of the pivot pin 114. The pivot pin 114 is maintained in the bores in the bosses 116 by plates 132 and 132' bolted to the bosses.

The piston rod 134 of hydraulic ram 110 is connected centrally of an equalizer bar 140. The extended ends 142 and 144 of the equalizer bar 140 are, in turn, connected to the rearwardly extending portions 100 and 102 of the movable arms 90 and 92, respectively, whereby upon reciprocation of the piston rod 134, the equalizer bar 140 is caused to reciprocate correspondingly which, in turn, raises and lowers the rearward extensions 100 and 102 of the movable arms 90 and 92 causing the forward ends of the movable arms to move toward and away from the fixed arms 70 and 72 of the loading attachment.

In order to compensate for differences in diameter of, for example, a log to be handled by the attachment and to equalize forces on the single traction device 110, the equalizer bar 140 is pivotally mounted through self-aligning bearings to the end of piston rod 134. FIG. 10 shows details of the pivotal mounting in which a pivot pin 146 is carried in the side members of the equalizer bar 140 and maintained therein by pin retaining blocks 148 and 148'. Centrally mounted on pin 146 is a bearing element 150 provided with a spherical bearing surface 152. The spherical bearing surface 152 is engaged by a complementary spherical surface on bearing element 154. The bearing element 154 is secured in a bore in extension piece 156 of the piston rod 134 by bearing plates 158 and 158'. By means of the self-aligning bearing assembly just described, the equalizer bar 140 may pivot about the axis of the pin 146 relative to the piston rod 134 as indicated in phantom lines in FIG. 3 of the drawings.

With the arms 90 and 92 being limited to pivotal movement about the pins 86 and 88, it is necessary to provide limited universal movement between the ends 142 and 144 of the equalizer bar 140 and their engagement with rearward extensions 100 and 102 of the movable arms. In FIG. 7 of the drawings one form of bearing means for providing the limited universal movement between the rearwardly extending end portions of the movable arms and the ends of the equalizer bar is illustrated. Both ends of the equalizer bar and their connection to the movable arms are identical and only one end 142 will be specifically described. The end 142 is shaped to provide an extended cylindrical bearing surface 142', which cylindrical bearing surface slidably receives a bearing element 162 having a complementary cylindrical bearing surface 164 on its inner surface and a spherical bearing surface 166 on its outer surface. The outer spherical bearing surface 166 is engaged by a complementary spherical bearing surface provided on the inner portion of bearing ring 168. The bearing ring 168 is maintained in a bore 170 in the rearwardly extending portion 102 of the arm 92 by plates 172 and 172' secured to the arm by bolts 174. Sliding movement of the ends of the equalizer bar 140 in the limited universal bearing structure is limited by end plates 178 secured to the outboard ends of the equalizer bar.

With the bearing as described with reference to FIG. 7 sliding motion is permitted between the cylindrical surface of the extended end 142 of the equalizer bar 140 and the inner surface of bearing element 162; and pivotal motion is permitted between the spherical surface 166 of bearing element 162 and a complementary spherical surface of bearing element 168 whereby the equalizer bar 140 may rock about the axis of pin 146 causing interdependent pivotal movement in the arms 90 and 92 without placing undesirable stresses on the connections between the ends of the equalizer bar and the rearward portions 100 and 102 of the pivotally mounted arms.

To further complete the assembly, the equalizer bar 140 is provided with an equalizing resilient member illustrated in the drawings as a leaf spring 180. The leaf spring 180 is center mounted to the upper end of extension 156 of the piston rod 134 by spring shackles 182 as illustrated in, for example, FIGS. 3 and 10 of the drawings. The extended ends of the leaf spring 180 engage the arms of the equalizer bar 140 and guide brackets 184 and 184' for the ends of the equalizer spring 180 may be secured to the upper surface of the equalizer bar. Since the center section of the leaf spring 180 is rigidly secured to the piston extension 156, rocking of the equalizer bar 140 relative to the piston extension 156 creates an opposing downward resilient pressure of one end of the leaf spring 180 on the high side of the equalizer bar 140 and an upward resilient pull on the low side through a respective guide bracket 184 and 184'. This is effective to maintain the movable arms 90 and 92 at a balanced degree of opening commensurate with the movement of piston rod 134 of the hydraulic ram 110. The leaf spring 180 also permits the movable arms 90 and 92 to adjust to the unequal spacing required of the arms when handling loads having variable diameters or for one of the movable arms 90 or 92 to engage either its stop member 104 or 106 or its fixed arm 70 or 72 to take up the reactive force balance from the other arm which is grasping a load to be conveyed.

Referring particularly to FIGS. 11 and 12, a modified form of the material handling structure of the present invention is shown wherein the equalizing leaf spring 80 is replaced by a torsion bar. In view of the substantial similarity between the principal structures of the two forms of the present invention, identical parts will be given identical reference characters. The frame of the material handling device which includes the pair of spaced parallel structural members 60 and 62 interconnected at their lower ends as hereinabove described with reference to FIGS. 1 through 10 and by a tubular member 66 at the upper end. The structural member 60 receives between the bifurcations 78 and 80 at its upper end an arm or fork member 310. Similarly, between the bifurcations 82 and 84 of structural member 62 is received an arm or fork member 312. Each of the arms or forks 310 and 312 is mounted for pivotal movement between their respective bifurcations 78—80 and 82—84 on the cylindrical surface of a torsion bar 314. The torsion bar 314 passes through bores in the bifurcations at the upper ends of structural members 60 and 62 and the sleeve bearings 96 and 98 of the fork members 310 and 312.

Inner and outer bushings 316 and 318 are provided on each side of the arms 310 and 312 for support of the torsion bar 314 and said movable arms. Thus, it will be seen that the torsion bar 314 extends through each of the arms and takes the place of pivot pins 86 and 88 in the mounting of the upper movable fork members from the form of the invention previously described.

Each of the outboard ends of the torsion bar 314 receives a torsion arm 320 or 322, respectively. The torsion arms are non-rotatably mounted to the torsion bar 314 as by splining 324 and maintained thereon by nuts 326 threadedly engaging the extended ends of the torsion bar.

Each torsion arm 320 and 322 has an inwardly curved projection 328 and 330, respectively, which are received in slots formed in torsion arm retaining blocks 332 and 334 integral with arms 310 and 312.

An equalizer bar 338 is mounted to the extended end of piston rod 134 of hydraulic ram 110 as previously described with reference to the self-aligning bearing means illustrated in FIG. 10 of the drawings. The outboard ends 144 of the equalizer bar 338 are also mounted by means of self-aligning and sliding bearing structures to each of the rearward projecting members 100 and 102 of equalizer bars 310 and 312, respectively. The form of the mounting means between the ends of the equalizer bar and the rearward members is specifically illustrated in FIG. 7. With this form of the invention upon reciprocation of the piston rod 134, the equalizer bar 338 is caused to reciprocate correspondingly which, in turn, raises and lowers the rearward extensions 100 and 102 of movable arms 310 and 312 causing the forward ends of the movable arms to move toward and away from their complementary fixed arms of the loading attachment. Rocking of the movable arms 310 and 312 causes the torsion bar 314 to rotate or twist after one of the movable arms 310 and 312 has clamped a load and rocking of the other arm 310 or 312 is continued as each of the torsion arms 320 and 322 are non-rotatably mounted adjacent the ends of the torsion bar and are fixedly mounted to torsion bar receiving members 332 and 334 carried by the respective arms. The interconnection of the two arms 310 and 312 through torsion arms 320 and 322 and torsion bar 314 is effective to normally maintain movable arms 310 and 312 at a balanced degree of opening and at the same time permits these arms to adjust within limits determined by the elasticity or resilience of torsion members to reasonable degrees of unequal spacing normally required of the pair of arms when handling loads having variable diameters. Preferably, the stiffness or elasticity of the torsion bar assembly will be such as to permit the bar to receive the full torsional load when only one of the pair of arms 310 or 312 is engaged with the load without the other arm having to bottom as previously described with reference to the employment of the equalizing spring 180.

Referring again to FIG. 11, each of the fork members 310 and 312 is also provided with a second torsion bar receiving bracket 332' and 334' respectively to permit the arms 310 and 312 to be interchanged in position whereby the fixed pair of arms and the movable pair of arms may be equally spaced and vertically aligned or the movable pair of arms offset from the fixed pair of arms.

Referring to FIGS. 13, 14 and 15, a modified form of material handling structure of the present invention is shown wherein another form of torsion means is employed in place of the torsion bar 314 of FIGS. 11 and 12. In FIGS. 13 through 15, the principal elements of the material handling structure are substantially identical to the forms of the invention shown in FIGS. 2 through 12 and identical parts are provided with identical reference characters.

The frame of the material handling device which includes the pair of spaced parallel structural members 60 and 62 interconnected at their lower ends as hereinabove described with reference to FIGS. 1 through 10 are bifurcated at their upper ends to provide elements 78 and 80 and 82 and 84, respectively. The structural members 60 and 62 receives between the bifurcations 78 and 80 and 82 and 84 sleeve bearing means 96 and 98 which form a part of the movable arms 350 and 352, respectively. Each of the movable arms 350 and 352 includes a forwardly extending material gripping portion 354 and a rearwardly extending portion 356. The latter portions 356 which have attachment to the equalizer bar are not specifically shown in FIGS. 13 through 15.

Each of the sleeve bearings 96 and 98 is mounted on a flanged end stub shaft 358 which stub shafts pass through bores in the respective bifurcated ends of the structural members 60 and 62. The outboard end of each of the stub shafts 358 is splined as at 360 and the splines 360 mate with cooperating splines on attachment elements 362 which in turn are welded to the outer face of their respective movable arm 350 and 352. Retainer means 364 are bolted to the ends of the stub shafts 358 to maintain the fixed alignment between the stub shafts and their respective movable arms. With this form of construction, stub shafts 358 rotate upon pivotal movement of the movable arms 350 and 352 of the material handling device upon actuation of the traction means connected to the equalizer member of the structure as hereinbefore described with reference to FIGS. 2 through 12. The flanged ends 366 of each of the stub shafts 358 has attachment to a mating flange 368 of its respective tubular element 370.

Concentrically maintained within each of the tubular members 370 is an end portion of a rigid structural bar 372. The end portions of the rigid bar 372 are maintained within the tubular members 370 by means of resilient sleeves 374 snugly engaging the inner walls of each of the tubular sleeves and the outer surface of the respective end portions of the rigid bar members 372. The resilient sleeves 374 may comprise natural or synthetic rubbers or plastic materials having high shear strength and a relatively low modulus of elasticity, such as nylon or Teflon and the like.

In order to prevent free movement between the surfaces of the resilient sleeves 74 and their mating surfaces of sleeves 370 and bar 372, the resilient elements are vulcanized or bonded thereto or secured thereto by adhesives or in the case of castable plastic materials, the plastic resilient composition may be molded or cast in the assembled relationship.

In operation of this form of the invention, rocking of the movable arms 350, 352 causes the torsion member to rotate as each of the stub shafts 358 is non-rotatably mounted to its respective arm. However, as soon as one of the movable arms 350 or 352 contacts, in clamping arrangement, a surface of the material to be loaded, the other arm will continue to move downwardly due to the resilient interconnection of the arms. The independent movement of the other of the arms is brought about by relative twisting movement between the bar 372 and the sleeve elements 370 which relative movement is resiliently absorbed in the resilient sleeve elements 374 maintained between the end portions of the bar 372 and the sleeves 370. Upon upward movement of the movable arms by the traction means, the pair of movable arms 350 and 352 are moved into relative parallel relationship by their resilient interconnection through the novel torsion means hereinabove described.

Figure 16:
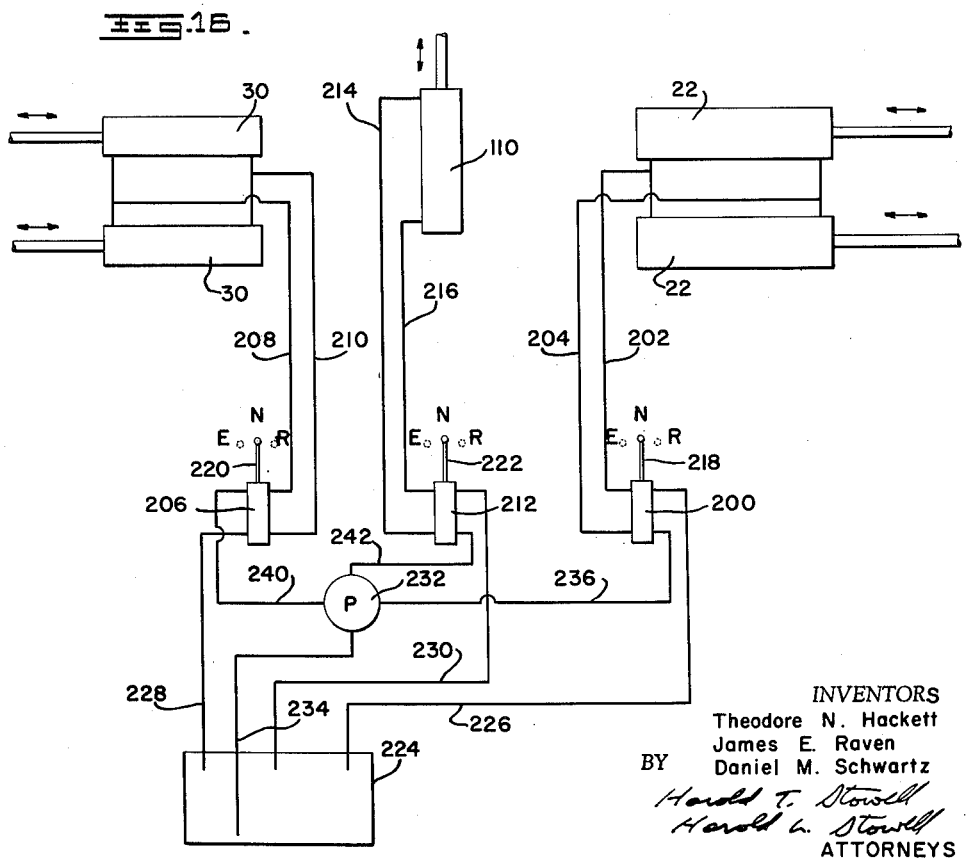
FIG. 16 is a schematic view of a hydraulic system for operating the improved material handling structure of the invention.

In FIG. 16 of the drawings a hydraulic circuit for actuation of the material handling machine described with reference to FIGS. 1 through 12 is diagrammatically illustrated. In FIG. 16, hydraulic rams 22 for raising the booms 14 are connected by conduits 202 and 204 to a three-position valve 200. Hydraulic rams 30 for tilting the frame 18 of the loading attachment are connected to a three-position valve 206 by conduits 208 and 210. The hydraulic ram 110 for opening and closing the movable forks of the material handling attachment is connected to a three-position valve 212 by conduits 214 and 216. Each of the valves 200, 206, and 212 is provided with a valve spool actuator or control handle 218, 220, and 222, respectively.

Each of the control handles may be placed in the "N" or neutral position whereby the flow of pressure fluid into or out of the corresponding conduits 202, 204, 208, 210, 216 or 214 is blocked. Each of the valve spools may be selectably in the "E" or piston extend position or the "R" or piston retract position to bring about the desired movement in the booms, the tilt rods, or the movable arms of the material handling attachment. Each of the valves 200, 206 and 212 is connected to a hydraulic reservoir 224 by a return line 226, 228 and 230, respectively. A pump 232 is connected by conduit 234 to the reservoir 224 and, further, the output of the pump is connected to valve 200 by conduit 236; to valve 206 by conduit 240 and to valve 212 by conduit 242. With the aforementioned hydraulic system, the operator of the vehicle has individual and selective control of the plural hydraulic rams which actuate the material handling superstructure of the tractor 10. However, as stated above, the boom structure may be very satisfactorily controlled by the pressure fluid control system described in U.S. patent application Serial No. 700,821, filed December 5, 1957, T. N. Hackett et al.

From the foregoing detailed discussion of the improved material handling machine and material handling device of the invention and the function of the various structures, those skilled in the art will readily visualize that the machine and its attachment may be employed in many and varied material handling operations. For example, the apparatus positioned with the fixed arms 70 and 72 in close adjacency and generally parallel to the ground, forward movement of the vehicle 10, with the movable arms in their most upwardly directed position, will force the fixed arms under a log or the like illustrated at A in FIG. 1. The operator, by the actuation of valve 222 from the neutral position to position "E" will cause the movable arms 90 and 92 to clamp the log A between the fixed arms and the movable arms as illustrated in full lines in FIG. 1 of the drawings. If the log A, maintained between the fixed and movable arms, is to be conveyed to another location, the operator may then raise the booms 14 by directing pressure fluid to the rams 22 by manipulation of the pressure fluid control valve 200. With the booms 14 in the elevated position and the log A clamped between the fixed and movable arms, the operator of the vehicle may then transport the log to another position where the log may then be dropped from its elevated position by pivoting the frame 18 of the logging attachment 15 by actuation of hydraulic rams 30 to a position where the extended ends of the fixed and movable arms are directed earthward, at which time retraction of the piston rod 134 into the cylinder 112 of hydraulic ram 110 will cause the arms 90 and 92 to move away from the fixed arms 70 and 72 permitting the log A to drop. Where it is desired to place the log upon the ground, the boom 14 is lowered prior to opening of the movable arms 90 and 92 by the operator.

Having described a complete embodiment of the present invention, it will be readily apparent to those skilled in the art that various modifications may be made in the form of the structures and in the means for their actuation without departing from the scope of the appended claims. For example, the material handling attachment 15 has been described with reference to a device having paired spaced fixed arms 70 and 72; it is contemplated, however, that substantially all of the advantages of the invention would be provided by an attachment having a single fixed arm positioned below the dual movable arms. It is also apparent that other forms of equalizer springs may be employed in conjunction with the equalizer bar 140 and that the traction means illustrated as a hydraulic ram 110 could be readily replaced by a rack and pinion traction means or any of various linkage means as are well known in the art.

Related subject matter is disclosed and claimed in U.S. patent application entitled "Material Handling Machine," Daniel M. Schwartz et al., Serial Number 767,111, filed October 14, 1958.

We claim:

1. A material handling attachment comprising a frame, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement therebetween, said bearing means being offset from the pivotal mounting between the pair of movable arms and the frame, and traction means connected to said equalizer bar intermediate its ends for moving the equalizer bar to rock the movable arms into movement about their pivotal connections to said frame.

2. The invention defined in claim 1 including resilient means urging said equalizer bar to a position parallel to the axis of the pivotal connection between the pair of movable arms and said frame.

3. A material handling attachment comprising a frame, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means providing limited universal movement between the equalizer bar and said pair of arms, said bearing means being off-set from the pivotal mounting between the pair of movable arms and the frame, and traction means connected to said equalizer bar intermediate its ends for moving the equalizer bar to rock the movable arms into movement about their pivotal connections to said frame.

4. A material handling attachment comprising a frame, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means providing pivotal movement about the ends of the equalizer bar and sliding movement along the axis thereof, said bearing means being off-set from the pivotal mounting between the pair of movable arms and the frame, and traction means connected to said equalizer bar intermediate its ends for moving the equalizer bar to rock the movable arms into movement about their pivotal connections to said frame.

5. A material handling attachment comprising a frame, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means being off-set from the pivotal mounting between the pair of movable arms and the frame, and traction means connected to said equalizer bar intermediate its ends for moving the equalizer bar to rock the movable arms into movement about their pivotal connections to said frame, said traction means comprising a fluid pressure actuated ram having one end pivotally connected to said equalizer bar intermediate itse ends and the other end connected to said frame.

6. The invention defined in claim 5 including resilient means urging said equalizer bar to a position normal to the axis of said ram.

7. The invention defined in claim 6 wherein said resilient means comprises a leaf spring, means securing the center of the leaf spring to said one end of the ram with each end of said leaf spring in engagement with the equalizer bar.

8. A material handling attachment comprising a frame, a pair of fixed arms extending from one end of said frame, a pair of movable arms, means pivotally mounting said pair of movable arms adjacent the other end of said frame for movement of the extended ends thereof toward and away from the fixed arms, an equalizer bar extending between the pair of movable arms, bearing means in each arm of the pair of movable arms pivotally mounting opposite ends of the equalizer bar to permit relative differential movement of the arms, said bearing means providing limited universal movement between the equalizer bar and said pair of arms, said bearing means being off-set from the pivotal mounting between the pair of movable arms and the frame, and traction means connected to said equalizer bar intermediate its ends for moving the equalizer bar to rock the movable arms into movement about their pivotal connections to said frame.

9. A material handling device comprising a boom, a frame, means pivotally mounting the lower end of the frame at the extended end of the boom, means for selectively pivoting the frame relative to said boom including a rod pivotally connected adjacent the upper end of said frame, and traction means for reciprocating said rod, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means providing limited universal movement between the equalizer bar and each arm of said pair of arms, said bearing means being off-set from the pivotal mounting between the pair of movable arms and the frame, and traction means connected to said equalizer bar intermediate its ends for moving the equalizer bar to rock the movable arms into movement about their pivotal connections to said frame.

10. A material handling attachment comprising a frame, a fixed arm extending from one end of said frame, a pair of movable arms, means pivotally mounting said pair of movable arms adjacent the other end of said frame for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means being off-set from the pivotal mounting between the pair of movable arms and the frame, traction means connected to said equalizer bar intermediate its ends for moving the equalizer bar to rock the movable arms into movement about their pivotal connections to said frame, said traction means comprising a fluid pressure actuated ram having one end pivotally connected to said equalizer bar intermediate its ends and the other end connected to said frame, and a torsion means interconnecting said movable arms and normally urging said movable arms into parallel relationship.

11. A material handling attachment comprising a frame, a fixed arm extending from one end of said frame, a torsion means pivotally mounted adjacent the other end of said frame, a pair of movable arms, means resiliently mounting said pair of movable arms to said torsion means for movement of the extended ends thereof toward and away from the fixed arm, an equalizer bar extending between the pair of movable arms, bearing means in each arm of the pair of movable arms pivotally mounting opposite ends of the equalizer bar to permit relative differential movement of the arms, said bearing means providing pivotal movement between the ends of the equalizer bar and sliding movement along the axis thereof, the bearing means being off-set from the mounting between the pair of movable arms and the torsion means, and traction means connected to said equalizer bar intermediate its ends for moving the equalizer bar to rock the movable arms toward and away from the fixed arm.

12. The invention defined in claim 10 wherein said torsion means comprises a torsion bar extending between the pair of movable arms, a torsion arm secured to each end of the torsion bar, and means securing each of said torsion arms to its respective movable arm at a point offset from the pivotal mounting between the pair of movable arms and the frame.

References Cited in the file of this patent

UNITED STATES PATENTS

| | | |
|---|---|---|
| 1,846,413 | Abbe | Feb. 23, 1932 |
| 2,757,813 | Adams | Aug. 7, 1956 |
| 2,776,768 | Carlson | Jan. 8, 1957 |
| 2,873,874 | Best | Feb. 17, 1959 |
| 2,886,194 | Codlin | May 12, 1959 |

FOREIGN PATENTS

| | | |
|---|---|---|
| 785,402 | Great Britain | Oct. 30, 1957 |